Patented Apr. 26, 1932

1,855,925

UNITED STATES PATENT OFFICE

ROY D. PULLEY AND FLOYD SEAVER, OF CHICAGO, ILLINOIS, ASSIGNORS, BY MESNE ASSIGNMENTS, TO INDUSTRIAL PATENTS CORPORATION, OF CHICAGO, ILLINOIS, A CORPORATION OF DELAWARE

METHOD OF CLEANING ANIMAL INTESTINES

No Drawing. Application filed January 18, 1930. Serial No. 421,725.

This invention relates to the cleaning of animal intestines, and preparing them for use as casings.

The main objects are to attain a thorough cleaning of the casings, avoid bacterial action in the walls, and thus preserve their toughness or strength, and to avoid fermentation and long periods of offensive soaking such as have been used in other cleaning processes.

The method of cleaning animal intestines according to this invention, as we have thus far found it to be most practicable, is substantially as follows:

Immediately after the killing of the animal and while the intestines still retain animal heat, the contents are stripped or squeezed out by means of stripping rollers. Then the casings are immediately immersed in a vat of warm water at a temperature of 110 to 115 degrees F., where they are soaked about one hour and thirty minutes; then immediately run through a second set of stripping rollers into a second vat of warm water at a temperature of about 110 to 115 degrees F., where they are again soaked for about thirty minutes, and then immediately restripped by hand and run into a cleaning machine vat at a temperature of 110 to 115 degrees F., and then cleaned, both inside and outside, for the first time. Thereafter they are given a recleaning which is the final cleaning.

As no bleaching is required in this method, the casings are therefore immediately graded, measured, salted drained as in a centrifugal wringer, and packed for shipment.

The first cleaning is only roughly done so as to remove slices or connecting tissue from the outside, and heavy slime from the inside of the casings.

When it is not practicable to give the final cleaning on the same day with the first cleaning hereinbefore mentioned, the casings are held over night in a vat of cold water, and then the final cleaning is given as soon as the work can be done the following morning. Such holding of the casings over night between the first and second cleanings is a matter of convenience in gang operation, rather than an essential of the preparing and cleaning process. When it is not necessary to so hold or store the casings over night, it is desirable to complete the process, including the final cleaning of the casings on the same day on which the animals are killed.

Regarding the periods of time and the temperatures hereinbefore mentioned, the process permits of considerable variation without departing from the spirit of the invention. Also other details of the specific process hereinbefore described may be modified or omitted except as hereinafter limited by the claims.

We claim:

1. The method of cleaning animal intestines comprising the stripping or squeezing out of the greater part of the contents of the casings immediately after the animal is killed and while the casings retain animal heat, then immediately soaking the casings in warm water, then stripping the casings again, then repeating the operation of soaking in warm water and stripping the casings, each soaking being in a different body of water, and then immediately cleaning the casings inside and outside; all such operations being completed before any substantial fermentation occurs in the casings.

2. The method of cleaning animal intestines, comprising the stripping and squeezing out of the greater part of the contents of the casings immediately after the animal is killed and while the casings retain animal heat, then immediately immersing them in a body of warm water at a temperature of about 110 to 115 degrees F., and soaking them therein for a period of time approximating one hour and thirty minutes; then immediately stripping the casings again and immersing them in a second body of warm water at a temperature of about 110 to 115 degrees F., and soaking them therein for a period of time approximating thirty minutes, then immediately restripping the casings and immediately depositing them in a container keeping the casings at a temperature of about 110 to 115 degrees F., and then immediately cleaning them.

3. The method of cleaning animal intestines, comprising the stripping or squeezing out of the greater part of the contents of the casings immediately after the animal is killed and while the intestines retain animal heat, then immediately immersing the casings in a body of warm water at a temperature of about 110 to 115 degrees F., and soaking them therein for a period of time approximately one hour and thirty minutes, then immediately restripping them and immersing them in a second body of warm water at about 110 to 115 degrees F., and soaking them therein for approximately thirty minutes, then immediately restripping the casings, and thereafter cleaning them inside and outside.

4. The method of cleaning animal intestines, comprising the stripping or squeezing out of the greater part of the contents of the casings immediately after the animal is killed and while the casings retain animal heat, then immediately immersing them in a body of warm water at a temperature of about 110 to 115 degrees F., and soaking them therein for a period of time approximately one hour and thirty minutes, then immediately restripping them and immersing them in a second body of warm water at about 110 to 115 degrees F., and soaking them therein for approximately thirty minutes, then immediately restripping the casings, and holding them at a temperature of about 110 to 115 degrees F., while cleaning the casings inside and outside.

Signed at Chicago, this 11th day of January, 1930.

ROY D. PULLEY.
FLOYD SEAVER.